(12) United States Patent
Sundara-Rajan et al.

(10) Patent No.: US 8,797,287 B2
(45) Date of Patent: Aug. 5, 2014

(54) SELECTIVE SCAN OF TOUCH-SENSITIVE AREA FOR PASSIVE OR ACTIVE TOUCH OR PROXIMITY INPUT

(75) Inventors: Kishore Sundara-Rajan, San Jose, CA (US); Trond Jarle Pedersen, Trondheim (NO); Shahrooz Shahparnia, Campbell, CA (US); Vemund Kval Bakken, Menlo Park, CA (US); John Stanley Dubery, Hants (GB); Martin John Simmons, Southampton (GB)

(73) Assignee: Atmel Corporation, San Jose, CA (US)

( * ) Notice: Subject to any disclaimer, the term of this patent is extended or adjusted under 35 U.S.C. 154(b) by 183 days.

(21) Appl. No.: 13/331,238

(22) Filed: Dec. 20, 2011

(65) Prior Publication Data

US 2013/0106716 A1    May 2, 2013

Related U.S. Application Data

(60) Provisional application No. 61/553,114, filed on Oct. 28, 2011.

(51) Int. Cl.
*G06F 3/041* (2006.01)
(52) U.S. Cl.
USPC ........ 345/173; 345/174; 345/179; 178/18.01; 178/18.03; 178/19.01
(58) Field of Classification Search
USPC ............ 345/173, 174, 179; 178/18.01, 18.03, 178/18.06, 19.01, 19.06, 19.04
See application file for complete search history.

(56) References Cited

U.S. PATENT DOCUMENTS

| | | | |
|---|---|---|---|
| 4,695,680 A | 9/1987 | Kable | |
| 5,973,677 A | 10/1999 | Gibbons | |
| 7,612,767 B1 | 11/2009 | Griffin | |
| 7,663,607 B2 | 2/2010 | Hotelling | |
| 7,875,814 B2 | 1/2011 | Chen | |
| 7,920,129 B2 | 4/2011 | Hotelling | |
| 8,031,094 B2 | 10/2011 | Hotelling | |
| 8,031,174 B2 | 10/2011 | Hamblin | |
| 8,040,326 B2 | 10/2011 | Hotelling | |
| 8,049,732 B2 | 11/2011 | Hotelling | |
| 8,179,381 B2 | 5/2012 | Frey | |
| 2004/0196267 A1* | 10/2004 | Kawai et al. | 345/173 |
| 2006/0012581 A1* | 1/2006 | Haim et al. | 345/173 |
| 2008/0238885 A1 | 10/2008 | Zachut | |

(Continued)

FOREIGN PATENT DOCUMENTS

WO    WO 2012/129247    9/2012

OTHER PUBLICATIONS

Kyung, Ki-Uk et al., "wUbi-Pen : Windows Graphical User Interface Interacting with Haptic Feedback Stylus," *SIGGRAPH*,, Los Angeles, California, Aug. 2008.

(Continued)

*Primary Examiner* — Koosha Sharifi-Tafreshi
(74) *Attorney, Agent, or Firm* — Baker Botts LLP

(57) ABSTRACT

In one embodiment, an apparatus comprises a touch sensor comprising a touch-sensitive area, and a touch-sensor controller coupled to the touch sensor. The touch-sensor controller is operable when executed to: select one or more regions associated with a stylus within the touch-sensitive area, and scan one or more electrodes within each region.

16 Claims, 7 Drawing Sheets

(56) References Cited

U.S. PATENT DOCUMENTS

| | | |
|---|---|---|
| 2009/0095540 A1 | 4/2009 | Zachut |
| 2009/0115725 A1 | 5/2009 | Shemesh |
| 2009/0127005 A1 | 5/2009 | Zachut |
| 2009/0128516 A1* | 5/2009 | Rimon et al. ............ 345/174 |
| 2009/0153152 A1 | 6/2009 | Maharyta |
| 2009/0184939 A1 | 7/2009 | Wohlstadter |
| 2009/0251434 A1 | 10/2009 | Rimon |
| 2009/0315854 A1 | 12/2009 | Matsuo |
| 2010/0006350 A1 | 1/2010 | Elias |
| 2010/0155153 A1 | 6/2010 | Zachut |
| 2010/0292945 A1 | 11/2010 | Reynolds |
| 2010/0315384 A1 | 12/2010 | Hargreaves |
| 2011/0007029 A1 | 1/2011 | Ben-David |
| 2012/0242588 A1 | 9/2012 | Myers |
| 2012/0242592 A1 | 9/2012 | Rothkopf |
| 2012/0243151 A1 | 9/2012 | Lynch |
| 2012/0243719 A1 | 9/2012 | Franklin |
| 2012/0327041 A1 | 12/2012 | Harley |

OTHER PUBLICATIONS

Lee, Johnny C. et al., "Haptic Pen: A Tactile Feedback Stylus for Touch Screens," *UIST '04*, vol. 6, Issue 2, Santa Fe, New Mexico, Oct. 2004.

Song, Hyunyoung et al., "Grips and Gestures on a Multi-Touch Pen," *CHI 2011, Session: Flexible Grips & Gestures*, Vancouver, BC, Canada May 2011.

Tan, Eng Chong et al., "Application of Capacitive Coupling to the Design of an Absolute-Coordinate Pointing Device," IEEE Transactions on Instrumentation and Measurement, vol. 54, No. 5, Oct. 2005.

U.S. Appl. No. 61/454,936, filed Mar. 21, 2011, Myers.
U.S. Appl. No. 61/454,950, filed Mar. 21, 2011, Lynch.
U.S. Appl. No. 61/454,894, filed Mar. 21, 2011, Rothkopf.

* cited by examiner

SELECTIVE SCAN OF TOUCH-SENSITIVE AREA FOR PASSIVE OR ACTIVE TOUCH OR PROXIMITY INPUT

RELATED APPLICATION

This application claims the benefit, under 35 U.S.C. §119(e), of U.S. Provisional Patent Application No. 61/553,114, filed 28 Oct. 2011, which is incorporated herein by reference.

TECHNICAL FIELD

This disclosure generally relates to touch sensors.

BACKGROUND

A touch sensor may detect the presence and location of a touch or object or the proximity of an object (such as a user's finger or a stylus) within a touch-sensitive area of the touch sensor overlaid on a display screen, for example. In a touch sensitive display application, the touch sensor may enable a user to interact directly with what is displayed on the screen, rather than indirectly with a mouse or touch pad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are a number of different types of touch sensors, such as, for example, resistive touch screens, surface acoustic wave touch screens, and capacitive touch screens. Herein, reference to a touch sensor may encompass a touch screen, and vice versa, where appropriate. When an object touches or comes within proximity of the surface of the capacitive touch screen, a change in capacitance may occur within the touch screen at the location of the touch or proximity. A touch-sensor controller may process the change in capacitance to determine its position on the touch screen.

DESCRIPTION OF EXAMPLE EMBODIMENTS

Figure 1:
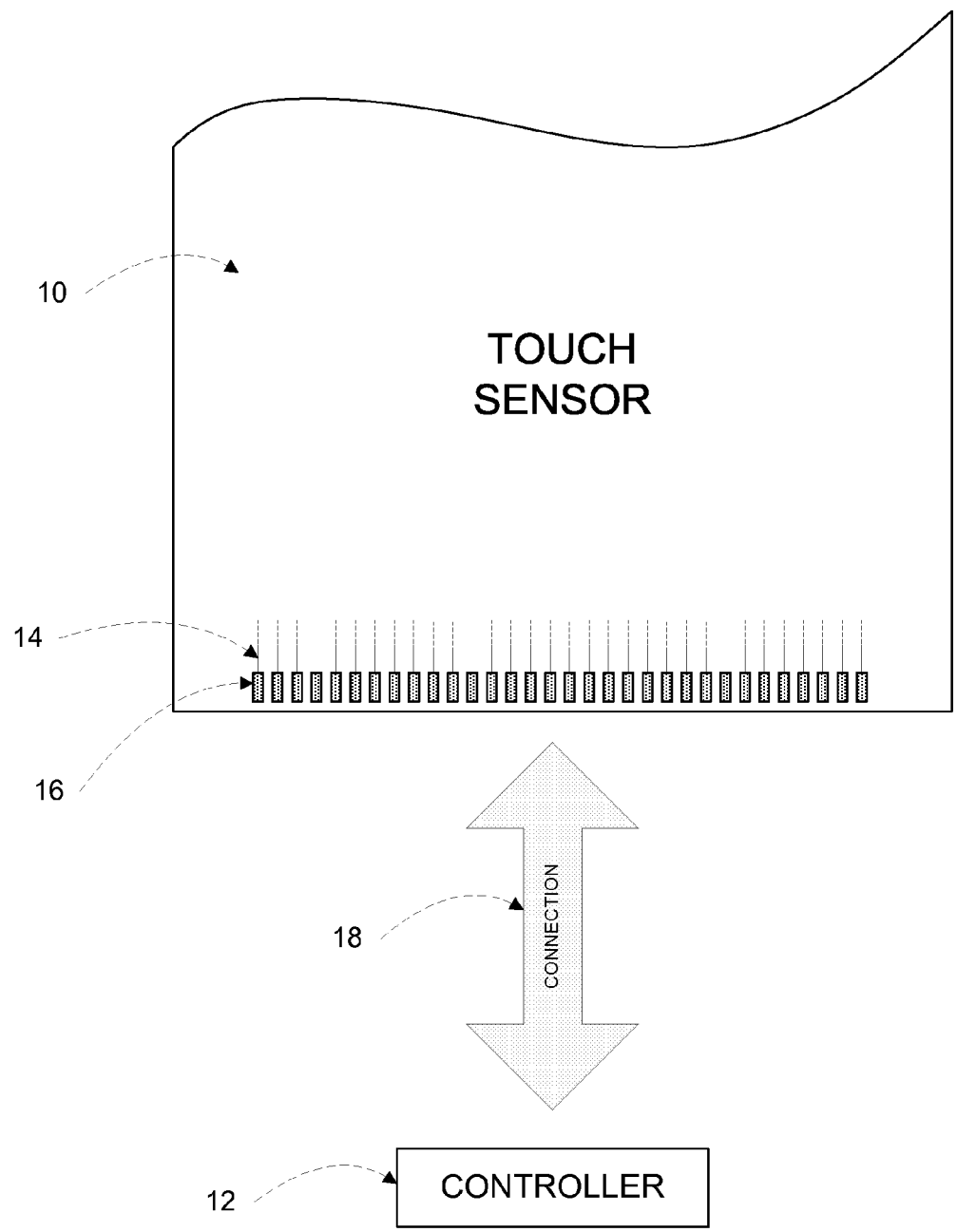
FIG. 1 illustrates an example touch sensor with an example touch-sensor controller.

FIG. 1 illustrates an example touch sensor 10 with an example touch-sensor controller 12. Touch sensor 10 and touch-sensor controller 12 may detect the presence and location of a touch or the proximity of an object within a touch-sensitive area of touch sensor 10. Herein, reference to a touch sensor may encompass both the touch sensor and its touch-sensor controller, where appropriate. Similarly, reference to a touch-sensor controller may encompass both the touch-sensor controller and its touch sensor, where appropriate. Touch sensor 10 may include one or more touch-sensitive areas, where appropriate. Touch sensor 10 may include an array of drive and sense electrodes (or an array of electrodes of a single type) disposed on one or more substrates, which may be made of a dielectric material. Herein, reference to a touch sensor may encompass both the electrodes of the touch sensor and the substrate(s) that they are disposed on, where appropriate. Alternatively, where appropriate, reference to a touch sensor may encompass the electrodes of the touch sensor, but not the substrate(s) that they are disposed on.

An electrode (whether a ground electrode, a guard electrode, a drive electrode, or a sense electrode) may be an area of conductive material forming a shape, such as for example a disc, square, rectangle, thin line, other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape (sometimes referred to as 100% fill), where appropriate. In particular embodiments, the conductive material of an electrode may occupy substantially less than 100% of the area of its shape. As an example and not by way of limitation, an electrode may be made of fine lines of metal or other conductive material (FLM), such as for example copper, silver, or a copper- or silver-based material, and the fine lines of conductive material may occupy approximately 5% of the area of its shape in a hatched, mesh, or other suitable pattern. Herein, reference to FLM encompasses such material, where appropriate. Although this disclosure describes or illustrates particular electrodes made of particular conductive material forming particular shapes with particular fill percentages having particular patterns, this disclosure contemplates any suitable electrodes made of any suitable conductive material forming any suitable shapes with any suitable fill percentages having any suitable patterns. Where appropriate, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection.

A mechanical stack may contain the substrate (or multiple substrates) and the conductive material forming the drive or sense electrodes of touch sensor 10. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the drive or sense electrodes. The mechanical stack may also include a second layer of OCA and a dielectric layer (which may be made of PET or another suitable material, similar to the substrate with the conductive material forming the drive or sense electrodes). As an alternative, where appropriate, a thin coating of a dielectric material may be applied instead of the second layer of OCA and the dielectric layer. The second layer of OCA may be disposed between the substrate with the conductive material making up the drive or sense electrodes and the dielectric layer, and the dielectric layer may be disposed between the second layer of OCA and an air gap to a display of a device including touch sensor 10 and touch-sensor controller 12. As an example only and not by way of limitation, the cover panel may have a thickness of approximately 1 millimeter (mm); the first layer of OCA may have a thickness of approximately 0.05 mm; the substrate with the conductive material forming the drive or sense electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of OCA, and air gap described above, with there being no air gap to the display.

One or more portions of the substrate of touch sensor 10 may be made of polyethylene terephthalate (PET) or another suitable material. This disclosure contemplates any suitable substrate with any suitable portions made of any suitable material. In particular embodiments, the drive or sense electrodes in touch sensor 10 may be made of ITO in whole or in part. In particular embodiments, the drive or sense electrodes in touch sensor 10 may be made of fine lines of metal or other conductive material. As an example and not by way of limitation, one or more portions of the conductive material may be copper or copper-based and have a thickness of approximately 5 microns ($\mu$m) or less and a width of approximately 10 $\mu$m or less. As another example, one or more portions of the conductive material may be silver or silver-based and similarly have a thickness of approximately 5 $\mu$m or less and a width of approximately 10 $\mu$m or less. This disclosure contemplates any suitable electrodes made of any suitable material.

Touch sensor 10 may implement a capacitive form of touch sensing. In a mutual-capacitance implementation, touch sensor 10 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space between them. A pulsed or alternating voltage applied to the drive electrode (by touch-sensor controller 12) may induce a charge on the sense electrode, and the amount of charge induced may be susceptible to external influence (such as a touch or the proximity of an object). When an object touches or comes within proximity of the capacitive node, a change in capacitance may occur at the capacitive node and touch-sensor controller 12 may measure the change in capacitance. By measuring changes in capacitance throughout the array, touch-sensor controller 12 may determine the position of the touch or proximity within the touch-sensitive area(s) of touch sensor 10.

In a self-capacitance implementation, touch sensor 10 may include an array of electrodes of a single type that may each form a capacitive node. When an object touches or comes within proximity of the capacitive node, a change in self-capacitance may occur at the capacitive node and touch-sensor controller 12 may measure the change in capacitance, for example, as a change in the amount of charge needed to raise the voltage at the capacitive node by a pre-determined amount. As with a mutual-capacitance implementation, by measuring changes in capacitance throughout the array, touch-sensor controller 12 may determine the position of the touch or proximity within the touch-sensitive area(s) of touch sensor 10. This disclosure contemplates any suitable form of capacitive touch sensing, where appropriate.

In particular embodiments, one or more drive electrodes may together form a drive line running horizontally or vertically or in any suitable orientation. Similarly, one or more sense electrodes may together form a sense line running horizontally or vertically or in any suitable orientation. In particular embodiments, drive lines may run substantially perpendicular to sense lines. Herein, reference to a drive line may encompass one or more drive electrodes making up the drive line, and vice versa, where appropriate. Similarly, reference to a sense line may encompass one or more sense electrodes making up the sense line, and vice versa, where appropriate.

Touch sensor 10 may have drive and sense electrodes disposed in a pattern on one side of a single substrate. In such a configuration, a pair of drive and sense electrodes capacitively coupled to each other across a space between them may form a capacitive node. For a self-capacitance implementation, electrodes of only a single type may be disposed in a pattern on a single substrate. In addition or as an alternative to having drive and sense electrodes disposed in a pattern on one side of a single substrate, touch sensor 10 may have drive electrodes disposed in a pattern on one side of a substrate and sense electrodes disposed in a pattern on another side of the substrate. Moreover, touch sensor 10 may have drive electrodes disposed in a pattern on one side of one substrate and sense electrodes disposed in a pattern on one side of another substrate. In such configurations, an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other—instead they are capacitively coupled to each other across a dielectric at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 10 may indicate a touch or proximity input at the position of the capacitive node. Touch-sensor controller 12 may detect and process the change in capacitance to determine the presence and location of the touch or proximity input. Touch-sensor controller 12 may then communicate information about the touch or proximity input to one or more other components (such one or more central processing units (CPUs)) of a device that includes touch sensor 10 and touch-sensor controller 12, which may respond to the touch or proximity input by initiating a function of the device (or an application running on the device). Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

Touch-sensor controller 12 may be one or more integrated circuits (ICs), such as for example general-purpose microprocessors, microcontrollers, programmable logic devices or arrays, application-specific ICs (ASICs). In particular embodiments, touch-sensor controller 12 comprises analog circuitry, digital logic, and digital non-volatile memory. In particular embodiments, touch-sensor controller 12 is disposed on a flexible printed circuit (FPC) bonded to the substrate of touch sensor 10, as described below. The FPC may be active or passive, where appropriate. In particular embodiments, multiple touch-sensor controllers 12 are disposed on the FPC. Touch-sensor controller 12 may include a processor unit, a drive unit, a sense unit, and a storage unit. The drive unit may supply drive signals to the drive electrodes of touch sensor 10. The sense unit may sense charge at the capacitive nodes of touch sensor 10 and provide measurement signals to the processor unit representing capacitances at the capacitive nodes. The processor unit may control the supply of drive signals to the drive electrodes by the drive unit and process measurement signals from the sense unit to detect and process the presence and location of a touch or proximity input within the touch-sensitive area(s) of touch sensor 10. The processor unit may also track changes in the position of a touch or proximity input within the touch-sensitive area(s) of touch sensor 10. The storage unit may store programming for execution by the processor unit, including programming for controlling the drive unit to supply drive signals to the drive electrodes, programming for processing measurement signals from the sense unit, and other suitable programming, where appropriate. Although this disclosure describes a particular touch-sensor controller having a particular implementation with particular components, this disclosure contemplates any suitable touch-sensor controller having any suitable implementation with any suitable components.

Tracks 14 of conductive material disposed on the substrate of touch sensor 10 may couple the drive or sense electrodes of touch sensor 10 to connection pads 16, also disposed on the substrate of touch sensor 10. As described below, connection pads 16 facilitate coupling of tracks 14 to touch-sensor controller 12. Tracks 14 may extend into or around (e.g. at the edges of) the touch-sensitive area(s) of touch sensor 10. Particular tracks 14 may provide drive connections for coupling touch-sensor controller 12 to drive electrodes of touch sensor 10, through which the drive unit of touch-sensor controller 12 may supply drive signals to the drive electrodes. Other tracks 14 may provide sense connections for coupling touch-sensor controller 12 to sense electrodes of touch sensor 10, through which the sense unit of touch-sensor controller 12 may sense charge at the capacitive nodes of touch sensor 10. Tracks 14 may be made of fine lines of metal or other conductive material. As an example and not by way of limitation, the conductive material of tracks 14 may be copper or copper-based and have a width of approximately 100 µm or less. As another example, the conductive material of tracks 14 may be silver or silver-based and have a width of approximately 100 µm or less. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor 10 may include one or more ground lines terminating at a ground connector (which may be a connection pad 16) at an edge of the substrate of touch sensor 10 (similar to tracks 14).

Connection pads 16 may be located along one or more edges of the substrate, outside the touch-sensitive area(s) of touch sensor 10. As described above, touch-sensor controller 12 may be on an FPC. Connection pads 16 may be made of the same material as tracks 14 and may be bonded to the FPC using an anisotropic conductive film (ACF). Connection 18 may include conductive lines on the FPC coupling touch-sensor controller 12 to connection pads 16, in turn coupling touch-sensor controller 12 to tracks 14 and to the drive or sense electrodes of touch sensor 10. In other embodiments, connection pads 16 may be connected an electro-mechanical connector (such as a zero insertion force wire-to-board connector). In these embodiments, connection 18 may not need to include an FPC. This disclosure contemplates any suitable connection 18 between touch-sensor controller 12 and touch sensor 10.

Figure 2:
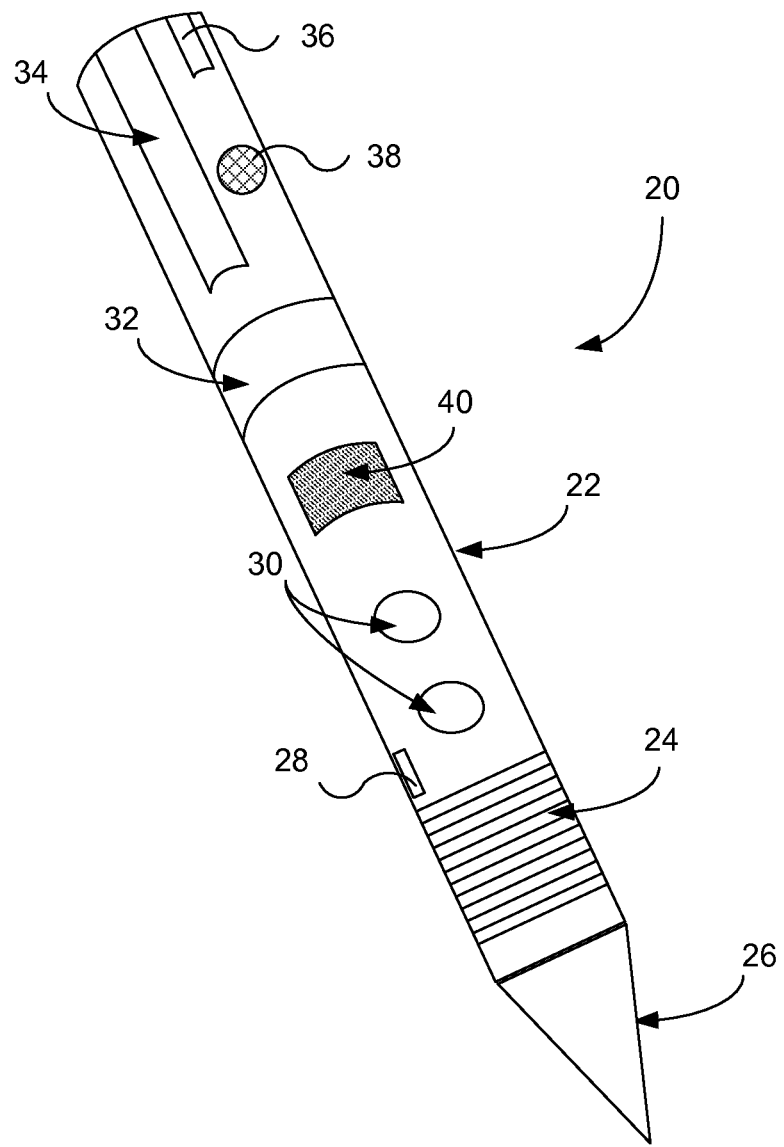
FIG. 2 illustrates an example active stylus exterior.

FIG. 2 illustrates an example exterior of an example active stylus 20. In particular embodiments, active stylus 20 is powered (e.g., by an internal or external power source) and is capable of providing touch or proximity inputs to a touch sensor (e.g., touch sensor 10 illustrated in FIG. 1). Active stylus 20 may include one or more components, such as buttons 30 or sliders 32 and 34 integrated with an outer body 22. These external components may provide for interaction between active stylus 20 and a user or between a device and a user. As an example and not by way of limitation, interactions may include communication between active stylus 20 and a device, enabling or altering functionality of active stylus 20 or a device, or providing feedback to or accepting input from one or more users. The device may by any suitable device, such as, for example and without limitation, a desktop computer, laptop computer, tablet computer, personal digital assistant (PDA), smartphone, satellite navigation device, portable media player, portable game console, kiosk computer, point-of-sale device, or other suitable device. Although this disclosure provides specific examples of particular components configured to provide particular interactions, this disclosure contemplates any suitable component configured to provide any suitable interaction. Active stylus 20 may have any suitable dimensions with outer body 22 made of any suitable material or combination of materials, such as, for example and without limitation, plastic or metal. In particular embodiments, exterior components (e.g. 30 or 32) of active stylus 20 may interact with internal components or programming of active stylus 20 or may initiate one or more interactions with one or more devices or other active styluses 20.

As described above, actuating one or more particular components may initiate an interaction between active stylus 20 and a user or between the device and the user. Components of active stylus 20 may include one or more buttons 30 or one or more sliders 32 and 34. As an example and not by way of limitation, buttons 30 or sliders 32 and 34 may be mechanical or capacitive and may function as a roller, trackball, or wheel. As another example, one or more sliders 32 or 34 may function as a vertical slider 34 aligned along a longitudinal axis of active stylus 20, while one or more wheel sliders 32 may be aligned around the circumference of active stylus 20. In particular embodiments, capacitive sliders 32 and 34 or buttons 30 may be implemented using one or more touch-sensitive areas. Touch-sensitive areas may have any suitable shape, dimensions, location, or be made from any suitable material. As an example and not by way of limitation, sliders 32 and 34 or buttons 30 may be implemented using areas of flexible mesh formed using lines of conductive material. As another example, sliders 32 and 34 or buttons 30 may be implemented using a FPC.

Active stylus 20 may have one or more components configured to provide feedback to or accepting feedback from a user, such as, for example and without limitation, tactile, visual, or audio feedback. Active stylus 20 may include one or more ridges or grooves 24 on its outer body 22. Ridges or grooves 24 may have any suitable dimensions, have any suitable spacing between ridges or grooves, or be located at any suitable area on outer body 22 of active stylus 20. As an example and not by way of limitation, ridges 24 may enhance a user's grip on outer body 22 of active stylus 20 or provide tactile feedback to or accept tactile input from a user. Active stylus 20 may include one or more audio components 38 capable of transmitting and receiving audio signals. As an example and not by way of limitation, audio component 38 may contain a microphone capable of recording or transmitting one or more users' voices. As another example, audio component 38 may provide an auditory indication of a power status of active stylus 20. Active stylus 20 may include one or more visual feedback components 36, such as a light-emitting diode (LED) indicator or electrophoretic ink (E-Ink). As an example and not by way of limitation, visual feedback component 36 may indicate a power status of active stylus 20 to the user.

One or more modified surface areas 40 may form one or more components on outer body 22 of active stylus 20. Properties of modified surface areas 40 may be different than properties of the remaining surface of outer body 22. As an example and not by way of limitation, modified surface area 40 may be modified to have a different texture, temperature, or electromagnetic characteristic relative to the surface properties of the remainder of outer body 22. Modified surface area 40 may be capable of dynamically altering its properties, for example by using haptic interfaces or rendering techniques. A user may interact with modified surface area 40 to provide any suitable functionally. For example and not by way of limitation, dragging a finger across modified surface area 40 may initiate an interaction, such as data transfer, between active stylus 20 and a device.

One or more components of active stylus 20 may be configured to communicate data between active stylus 20 and the device. For example, active stylus 20 may include one or more tips 26 or nibs. Tip 26 may include one or more electrodes configured to communicate data between active stylus 20 and one or more devices or other active styluses. Tip 26 may provide or communicate pressure information (e.g., the amount of pressure being exerted by active stylus 20 through tip 26) between active stylus 20 and one or more devices or other active styluses. Tip 26 may be made of any suitable material, such as a conductive material, and have any suitable dimensions, such as, for example, a diameter of 1 mm or less at its terminal end. Active stylus 20 may include one or more ports 28 located at any suitable location on outer body 22 of active stylus 20. Port 28 may be configured to transfer signals or information between active stylus 20 and one or more devices or power sources via, for example, wired coupling. Port 28 may transfer signals or information by any suitable technology, such as, for example, by universal serial bus (USB) or Ethernet connections. Although this disclosure describes and illustrates a particular configuration of particular components with particular locations, dimensions, composition and functionality, this disclosure contemplates any suitable configuration of suitable components with any suitable locations, dimensions, composition, and functionality with respect to active stylus 20.

Figure 3:
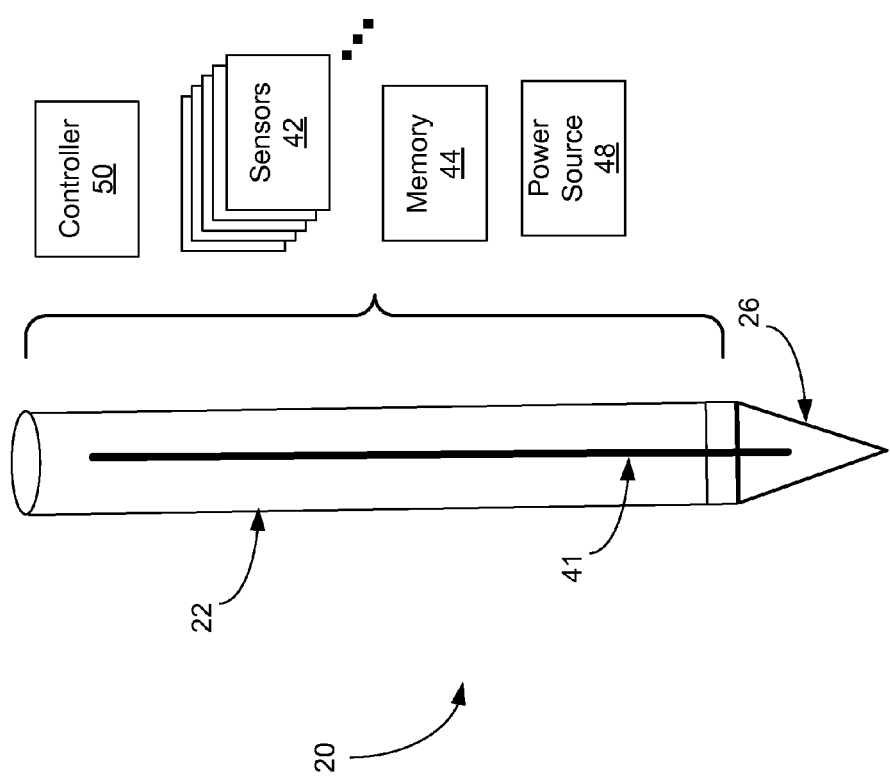
FIG. 3 illustrates an example active stylus interior.

FIG. 3 illustrates example internal components of example active stylus 20. Active stylus 20 includes one or more internal components, such as a controller 50, sensors 42, memory 44, or power source 48. In particular embodiments, one or more internal components may be configured to provide for interaction between active stylus 20 and a user or between a device and a user. In other particular embodiments, one or more internal components, in conjunction with one or more external components described above, may be configured to provide interaction between active stylus 20 and a user or between a device and a user. As an example and not by way of limitation, interactions may include communication between active stylus 20 and a device, enabling or altering functionality of active stylus 20 or a device, or providing feedback to or accepting input from one or more users. As another example, active stylus 20 may communicate via any applicable short distance, low energy data transmission or modulation link, such as, for example and without limitation, via a radio frequency (RF) communication link. In this case, active stylus 20 includes a RF device for transmitting data over the RF link.

Controller 50 may be a microcontroller or any other type of processor suitable for controlling the operation of active stylus 20. Controller 50 may be one or more ICs—such as, for example, general-purpose microprocessors, microcontrollers, PLDs, PLAs, or ASICs. Controller 50 may include a processor unit, a drive unit, a sense unit, and a storage unit. The drive unit may supply signals to electrodes of tip 26 through center shaft 41. The drive unit may also supply signals to control or drive sensors 42 or one or more external components of active stylus 20. The sense unit may sense signals received by electrodes of tip 26 through center shaft 41 and provide measurement signals to the processor unit representing input from a device. The sense unit may also sense signals generated by sensors 42 or one or more external components and provide measurement signals to the processor unit representing input from a user. The processor unit may control the supply of signals to the electrodes of tip 26 and process measurement signals from the sense unit to detect and process input from the device. The processor unit may also process measurement signals from sensors 42 or one or more external components. The storage unit may store programming for execution by the processor unit, including programming for controlling the drive unit to supply signals to the electrodes of tip 26, programming for processing measurement signals from the sense unit corresponding to input from the device, programming for processing measurement signals from sensors 42 or external components to initiate a pre-determined function or gesture to be performed by active stylus 20 or the device, and other suitable programming, where appropriate. As an example and not by way of limitation, programming executed by controller 50 may electronically filter signals received from the sense unit. Although this disclosure describes a particular controller 50 having a particular implementation with particular components, this disclosure contemplates any suitable controller having any suitable implementation with any suitable components.

In particular embodiments, active stylus 20 may include one or more sensors 42, such as touch sensors, gyroscopes, accelerometers, contact sensors, or any other type of sensor that detect or measure data about the environment in which active stylus 20 operates. Sensors 42 may detect and measure one or more characteristic of active stylus 20, such as acceleration or movement, orientation, contact, pressure on outer body 22, force on tip 26, vibration, or any other suitable characteristic of active stylus 20. As an example and not by way of limitation, sensors 42 may be implemented mechanically, electronically, or capacitively. As described above, data detected or measured by sensors 42 communicated to controller 50 may initiate a pre-determined function or gesture to be performed by active stylus 20 or the device. In particular embodiments, data detected or received by sensors 42 may be stored in memory 44. Memory 44 may be any form of memory suitable for storing data in active stylus 20. In other particular embodiments, controller 50 may access data stored in memory 44. As an example and not by way of limitation, memory 44 may store programming for execution by the processor unit of controller 50. As another example, data measured by sensors 42 may be processed by controller 50 and stored in memory 44.

Power source 48 may be any type of stored-energy source, including electrical or chemical-energy sources, suitable for powering the operation of active stylus 20. In particular embodiments, power source 48 may be charged by energy from a user or device. As an example and not by way of limitation, power source 48 may be a rechargeable battery that may be charged by motion induced on active stylus 20. In other particular embodiments, power source 48 of active stylus 20 may provide power to or receive power from the device or other external power source. As an example and not by way of limitation, power may be inductively transferred between power source 48 and a power source of the device or another external power source, such as a wireless power transmitter. Power source may also be powered by a wired connection through an applicable port coupled to a suitable power source.

Figure 4:
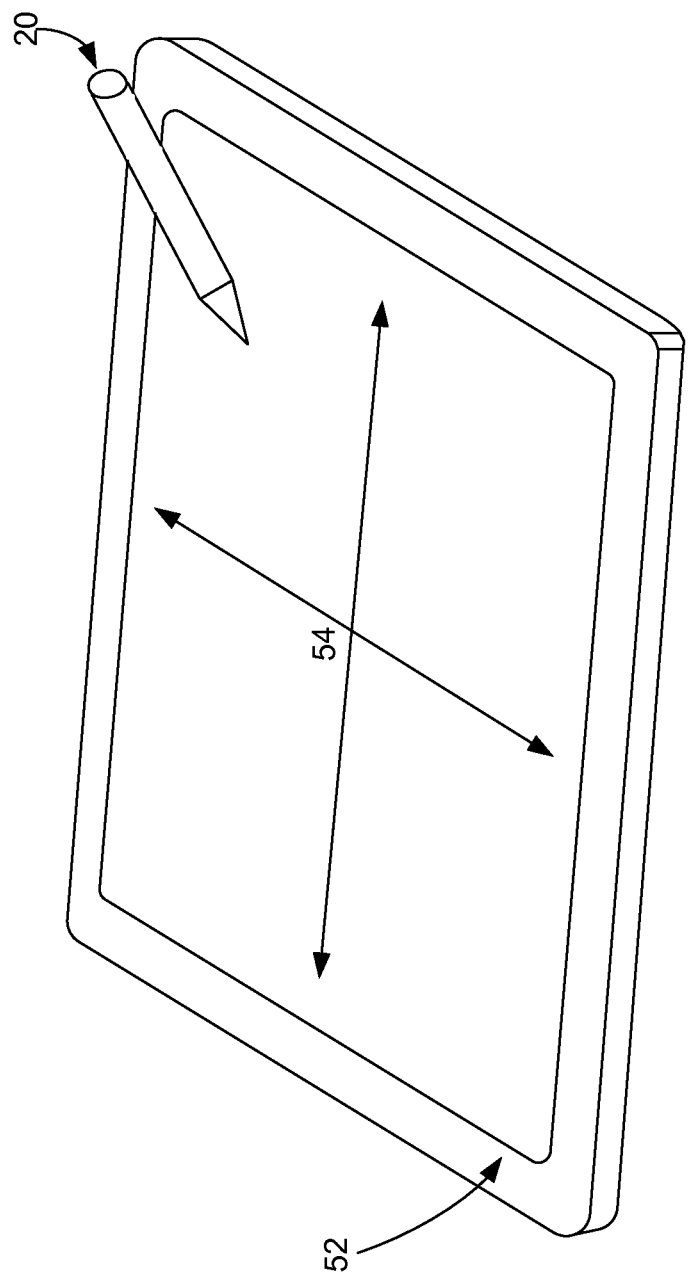
FIG. 4 illustrates an example active stylus with touch sensor device.

FIG. 4 illustrates an example active stylus 20 with an example device 52. Device 52 may have a display (not shown) and a touch sensor with a touch-sensitive area 54. Device 52 display may be a liquid crystal display (LCD), a LED display, a LED-backlight LCD, or other suitable display and may be visible though a cover panel and substrate (and the drive and sense electrodes of the touch sensor disposed on it) of device 52. Although this disclosure describes a particular device display and particular display types, this disclosure contemplates any suitable device display and any suitable display types.

Device 52 electronics may provide the functionality of device 52. As example and not by way of limitation, device 52 electronics may include circuitry or other electronics for wireless communication to or from device 52, execute programming on device 52, generating graphical or other user interfaces (UIs) for device 52 display to display to a user, managing power to device 52 from a battery or other power source, taking still pictures, recording video, other suitable functionality, or any suitable combination of these. Although this disclosure describes particular device electronics providing particular functionality of a particular device, this disclosure contemplates any suitable device electronics providing any suitable functionality of any suitable device.

In particular embodiments, active stylus 20 and device 52 may be synchronized prior to communication of data between active stylus 20 and device 52. As an example and not by way of limitation, active stylus 20 may be synchronized to device 52 through a pre-determined bit sequence transmitted by the touch sensor of device 52. As another example, active stylus 20 may be synchronized to device by processing the drive signal transmitted by drive electrodes of the touch sensor of device 52. Active stylus 20 may interact or communicate with device 52 when active stylus 20 is brought in contact with or in proximity to touch-sensitive area 54 of the touch sensor of device 52. In particular embodiments, interaction between active stylus 20 and device 52 may be capacitive or inductive. As an example and not by way of limitation, when active stylus 20 is brought in contact with or in the proximity of touch-sensitive area 54 of device 52, signals generated by active stylus 20 may influence capacitive nodes of touch-sensitive area of device 52 or vice versa. As another example, a power source of active stylus 20 may be inductively charged through the touch sensor of device 52, or vice versa. Although this disclosure describes particular interactions and communications between active stylus 20 and device 52, this disclosure contemplates any suitable interactions and communications through any suitable means, such as mechanical forces, current, voltage, or electromagnetic fields.

In particular embodiments, measurement signal from the sensors of active stylus 20 may initiate, provide for, or terminate interactions between active stylus 20 and one or more devices 52 or one or more users, as described above. Interaction between active stylus 20 and device 52 may occur when active stylus 20 is contacting or in proximity to device 52. As an example and not by way of limitation, a user may perform a gesture or sequence of gestures, such as shaking or inverting active stylus 20, whilst active stylus 20 is hovering above touch-sensitive area 54 of device 52. Active stylus may interact with device 52 based on the gesture performed with active stylus 20 to initiate a pre-determined function, such as authenticating a user associated with active stylus 20 or device 52. Although this disclosure describes particular movements providing particular types of interactions between active stylus 20 and device 52, this disclosure contemplates any suitable movement influencing any suitable interaction in any suitable way.

Figure 5:
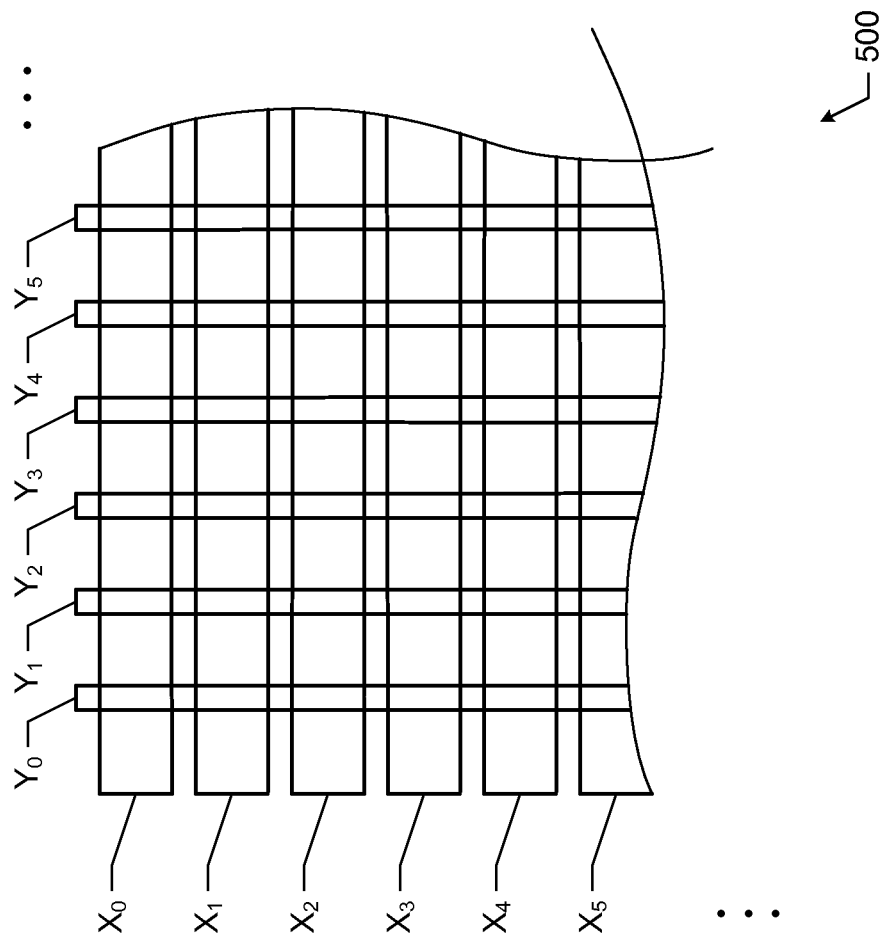
FIG. 5 illustrates an example array of electrodes.

As described above in connection with FIG. 1, in particular embodiments, a touch sensor (e.g., touch sensor 10 illustrated in FIG. 1) may include an array of drive and sense electrodes or an array of electrodes of a single type. These electrodes may be coupled to a controller (e.g., controller 12 illustrated in FIG. 1) by specific tracks (e.g., tracks 14 illustrated in FIG. 1). The drive unit of the controller may supply drive signals to the drive electrodes through some tracks, and the sense unit of the controller may sense charge at the capacitive nodes through other tracks. The electrodes may be arranged in various patterns and this disclosure contemplates any suitable patterns for the electrode arrangements. For example, FIG. 5 illustrates an example array of electrodes arranged in a X-Y grid pattern. In particular embodiments, the drive electrodes may be arranged along one set of lines (e.g., the X lines: $X_1$ to $X_n$) and the sense electrodes may be arranged along another set of lines (e.g., the Y lines: $Y_1$ to $Y_n$). The capacitive nodes may be at one or more intersections of the X and Y lines. A touch-sensitive area 500 may be populated with these electrodes.

In particular embodiments, the electrodes within a touch-sensitive area may be scanned in order to, for example, determine one or more locations associated with an object, such as a stylus or a user's finger, within the touch-sensitive area. In particular embodiments, when scanning the electrodes, there are two options. First, some (e.g., every 2, 3, 4, or 5 electrodes) or all the electrodes within the entire touch-sensitive area may be scanned. Alternatively, second, one or more specific regions within the touch-sensitive area may be selected, and some (e.g., one or more) or all the electrodes within each specific region may be scanned.

More specifically, in particular embodiments, to determine the location or locations associated with an object, such as a stylus or a user's finger, within a touch-sensitive area (e.g., touch-sensitive area 500), a scan of some or all the electrodes or coordinates within the touch-sensitive area may be performed (e.g., sequentially or parallely driving some or all the drive electrodes and sequentially or parallely scanning some or all the capacitive nodes within touch-sensitive area 500). However, scanning the electrodes or coordinates within the entire touch-sensitive area may take a relatively long time, even when only some of the electrodes are scanned, and thus limit the system operation speed. Alternatively, in particular embodiments, a scan of some or all the electrodes within a number (e.g., one or more) of specific regions within the touch-sensitive area may be performed to determine the actual current location or locations associated with the object.

Figure 6:
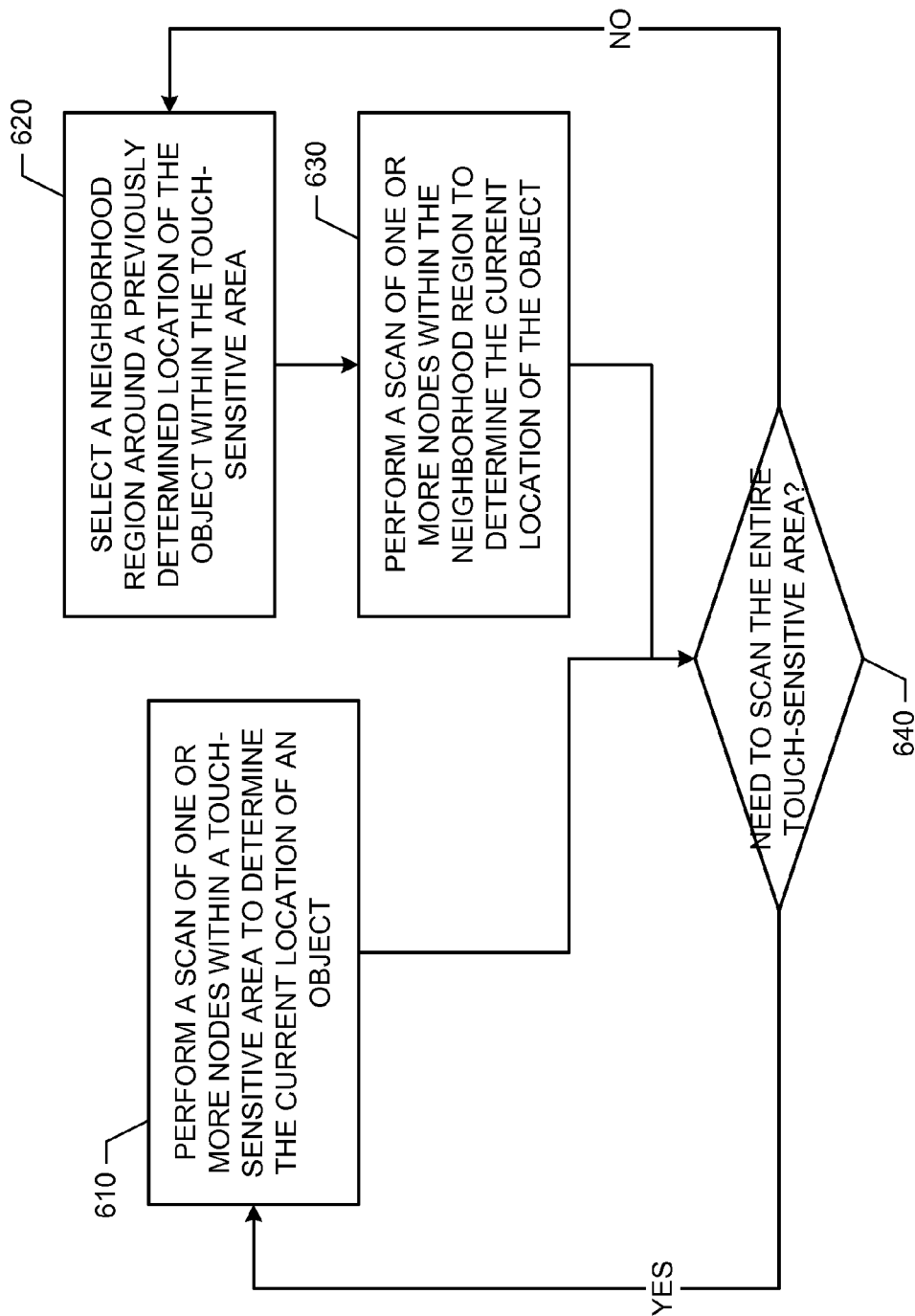
FIG. 6 illustrates an example method for scanning selected regions of a touch-sensitive area to determine the location associated with an object.

FIG. 6 illustrates an example method for scanning selected regions of a touch-sensitive area. Sometimes, these regions may be referred to as "regions of interest". In particular embodiments, the current locations of an object, such as a stylus or a user's finger, as it moves around a touch-sensitive area, are to be determined. That is, as the object moves to a new location, that location may be determined. Thus, as the object moves around the touch-sensitive area, its current locations may be determined in successive iterations. Note that it is not always necessary that the object actually comes into physical contact with the touch-sensitive area. In some cases, the object may be in proximity but not yet in actual physical contact with the touch-sensitive area (e.g., hovering above the touch-sensitive area).

In particular embodiments, initially, a scan of some (e.g., one or more) or all the nodes in the touch-sensitive area may be performed to determine the current location of the object within the touch-sensitive area (as illustrated in STEP 610 of FIG. 6). In some implementations, a self capacitance or mutual capacitance measurement may be done to determine the current location of the object within the touch-sensitive area. Using an example touch-sensitive area 700 illustrated in FIG. 7 to further demonstrate, touch-sensitive area 700 may be populated with electrodes. Initially, some (e.g., every other or third) or all the drive electrodes in touch-sensitive area 700 may be driven, either in sequence or in parallel, and some (e.g., every other or third) or all the corresponding capacitive nodes in touch-sensitive area 700 may be scanned, either in sequence or in parallel, to determine the current location of the object.

In some implementations, when scanning a touch-sensitive area, a subset of the nodes within the touch-sensitive area may be scanned. For example, within touch-sensitive area 700, every second drive electrode may be driven and every second corresponding node may be scanned. As another example, every third drive electrode may be driven and every third corresponding node may be scanned. Thus, different subsets of electrodes may be scanned for different implementations, and this disclosure contemplates scanning any applicable subset of electrodes within a touch-sensitive area. Alternatively, in other implementations, all the electrodes within a touch-sensitive area may be scanned.

Figure 7:
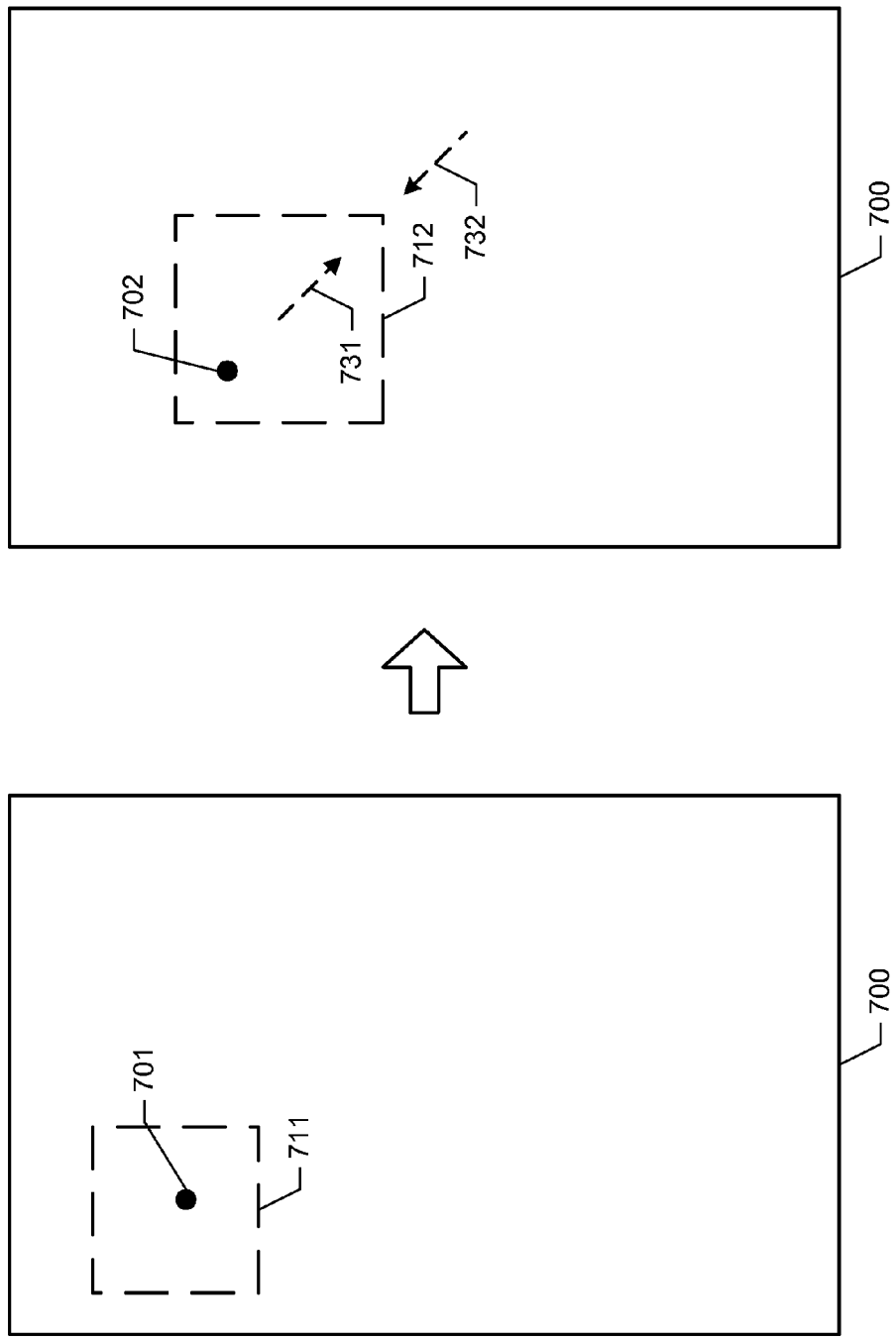
FIG. 7 illustrates an example touch-sensitive area.

Suppose that the current location of the object, as determined in STEP 610, is location 701 illustrated in FIG. 7. The object may then move to another location within the touch-sensitive area. For example, a user may move the stylus or his finger to another location within the touch-sensitive area. In particular embodiments, to determine the new current location of the object, there are two options. First, another scan of the nodes in the touch-sensitive area may be performed to determine the new current location within the touch-sensitive area where the object has moved to (as illustrated in STEP 610 of FIG. 6).

Second and alternatively, instead of performing another scan of the entire touch-sensitive area to determine the new current location of the object, a neighborhood region around the previously determined location of the object is selected (as illustrated in STEP 620 of FIG. 6). In some implementations, this neighborhood region may be a window. For example, in FIG. 7, a window 711 indicates a neighborhood region of location 701, which has just been determined during the previous iteration. In particular embodiments, there are various factors that affect how the region is selected. These factors may form a set of metrics, which is described in more detail below. In particular embodiments, the nodes within the selected neighborhood region are then scanned to determine the now current location of the object within the touch-sensitive area (as illustrated in STEP 630 of FIG. 6). In some implementations, a mutual capacitance or self capacitance measurement within the selected neighborhood region may be done to determine the current location of the object. In the example illustrated in FIG. 7, only the drive electrodes within window 711 are driven and only the capacitive nodes within window 711 are scanned to determine the current location of the object over touch-sensitive area 700. Suppose that the object is now at location 702 illustrated in FIG. 7. When scanning the nodes within a selected region, again, there are two options. In some cases, all the nodes within the selected region may be scanned. Alternative, only some of the nodes (e.g., every second or fifth node) within the selected region may be scanned. This disclosure contemplates scanning any number of nodes within a selected region.

Although FIG. 7 illustrates only one selected region (e.g., window 711) within touch-sensitive area 700, in particular embodiments, any number (e.g., one or more) of regions may be selected and scanned at a time (e.g., in sequence or in parallel during each iteration). As an example, a user may use two fingers to move around a touch-sensitive area simultaneously. Each finger has its own location. Thus, during each iteration, two locations may be determined to be associated with the two fingers, respectively. A different neighborhood region may be selected around each determined location, thus resulting in two selected regions. The electrodes within both regions may be scanned (e.g., in sequence or concurrently). As another example, suppose that based on certain available information (e.g., factors described below that affect how a region is selected) during the current iteration, it may be predicted that the object may be located within three possible smaller regions during the next iteration. Instead of selecting a larger region that covers all three possible smaller regions, the three smaller regions may be selected. The electrodes within each smaller regions are then scanned during the next iteration. If two or more regions are selected at a time (e.g., respectively around two or more previously determined locations), these regions may or may not overlap.

The object may then move to another location within the touch-sensitive area. Again, one of the two options described above may be used to determine the new current location of the object. That is, either a scan of the entire touch-sensitive area may be performed, or a neighborhood region of the previously determined location (e.g., a window 712 around location 702 illustrated in FIG. 7) may be selected and a scan of the electrodes or coordinates within this neighborhood region may be performed. This process may be repeated in successive iterations as the object moves around the touch-sensitive area.

A touch-sensitive area (e.g., touch-sensitive area 700) may include a relatively large number of electrodes. Scanning the nodes in the entire touch-sensitive area may take a relatively long time. On the other hand, a selected region within the touch-sensitive area (e.g., windows 711 or 712) includes a relatively small number of electrodes, and scanning the nodes inside this selected region takes a relatively short time. In practice, when an object (e.g., a stylus or a user's finger) moves around the touch-sensitive area, it often moves only a relatively small distance from one iteration to another iteration. For example, as illustrated in FIG. 7, suppose that during the first iteration, the location of the object over touch-sensitive area 700 has been determined as location 701. During the second iteration, it is likely that the new location (e.g., location 702) of the object is somewhere near location 701, which has been determined during the first iteration. Thus, if an appropriate neighborhood region (e.g., window 711) is selected around location 701, it is likely that the new location of the object during the second iteration should be within window 711. If so, only the nodes within window 711 need to be scanned to determine the new location of the object during the second iteration. This saves operation time as it is faster to scan only the nodes within a smaller selected region (e.g., window 711) than to scan the nodes in the entire touch-sensitive area (e.g., touch-sensitive area 700).

However, during some iterations, it may nevertheless be desirable or necessary to scan some or all the nodes in the entire touch-sensitive area (e.g., to ensure accuracy of the determined locations of the object). In particular embodiments, during each iteration, a decision as to whether to scan the entire touch-sensitive area or to scan only within a selected neighborhood region of the previously determined location of the object is made (as illustrated in STEP 640 of FIG. 6). In some implementations, this decision may be made, for example, at the beginning of the iteration before the scan for the current iteration is performed. In this case, the decision may be made for the current iteration. That is, whether, for the current iteration, the scan should be performed for the entire touch-sensitive area or only within the neighborhood region of the previously determined location of the object. Alternatively, in some implementations, this decision may be made, for example, at the end of the iteration after the scan for the current iteration has been performed (as illustrated in FIG. 6). In this case, the decision may be made for the next iteration. That is, whether, for the next iteration, the scan should be performed for the entire touch-sensitive area or only within the neighborhood region of the previously determined location of the object.

There are various factors that may affect whether, for a given iteration, the scan should be performed for the entire touch-sensitive area or only within the neighborhood region of the previously determined location of the object, and this disclosure contemplates any applicable factor. In particular embodiments, there may be various conditions, and if any one of these conditions is satisfied during a particular iteration, then the scan is performed for the entire touch-sensitive area for that iteration. Otherwise, the scan is performed only within the neighborhood region of the previously determined location of the object for that iteration. For example, one condition may be a predetermined time interval (e.g., n milliseconds). In this case, for at least every n milliseconds, a scan of the entire touch-sensitive area is performed. The time interval may be adjusted dynamically depending on how fast the object moves around the touch-sensitive area. If the object moves relatively fast, the time interval may be shorter; and if the object moves relatively slow, the time interval may be longer. A second condition may be whether the system has fallen out of calibration. If so, a scan of the entire touch-sensitive area may be performed to readjust system calibration. A third condition may be that if the object has moved away from or outside of the touch-sensitive area (e.g., the user has temporarily put down the stylus to perform some other actions), then a scan of the entire touch-sensitive area may be performed after the object returns to the touch-sensitive area (e.g., the user starts to use the stylus again). A fourth condition may be that if there has been a contextual change or an interface change, then a scan of the entire touch-sensitive area may be performed. A fifth condition may be that the object has moved outside the selected neighborhood region during a particular iteration. If this happens, during the next iteration, a scan of the entire touch-sensitive area may be performed to relocate the object. Other conditions may include interrupts from other sensor modules, whether there is a loss or pressure exerted on the touch-sensitive area by the object, or passivation of other parasitic capacitances. These conditions may be programmable and this disclosure contemplates any applicable condition.

In particular embodiments, the neighborhood region around the previously determined location of the object may be dynamically selected (e.g., in terms of its size and position) for each iteration. For example, in FIG. 7, during one iteration, window 711 is approximately centered around location 701. However, during another iteration, location 702 is nearer the top-left corner of window 712 instead of at its center. In addition, window 712 is bigger than window 711. There may be various factors that affect how a region (e.g., in terms of its size or position) is selected within a touch-sensitive area, and this disclosure contemplates any applicable factor.

For example, in some implementations, the size or position of the window around the object's location may depend on how fast the object moves (e.g., the object's speed) or in what direction the object moves. The speed at which the object moves or the direction in which the object moves may be determined based on the locations of the object determined during previous iterations. For example, for two consecutive iterations, if the two locations of the object are relatively far apart, this may suggest that the object is moving relatively fast. Conversely, if the two locations of the object are relatively close, this may suggest that the object is moving relatively slowly.

As another example, in some implementations, if the object moves relatively fast, the size of the window may be somewhat larger. This may help ensure that the object does not move outside of the selected neighborhood region (e.g., the window) from one iteration to another iteration. Conversely, if the object moves relatively slow, the size of the window may be somewhat smaller. In some implementations, as the object moves faster from one iteration to another iteration, the size of the window may increase accordingly from one iteration to another iteration. Conversely, as the object moves slower from one iteration to another iteration, the size of the window may decrease accordingly from one iteration to another iteration.

The window may be positioned around the previously determined location of the object depending on in which direction the object moves. For example, if the object is relatively stationary, the window may approximately center around the object's location. If the object is moving toward a specific direction, the window may be positioned so that there is more space inside the window in the direction toward which the object is moving. Again, this may help ensure that the object does not move outside of the selected neighborhood region from one iteration to another iteration. For example, in FIG. 7, from location 701 to location 702, it may be determined that the object is moving toward bottom-right direction 731. Thus, window 712 may be positioned around location 702 so that there is more space inside window 712 that is on the bottom-right side of location 702. In addition, in some implementations, the speed of touch and the vector (e.g., direction) of the object's movements may be used to predict the size and position of the new location of the object to be determined. Thus, they may help predict the size or position of the region selected.

In particular embodiments, a set of metrics is used to help determine how a region (e.g., a window) is selected within a touch-sensitive area. The metrics may include, for example and without limitation, speed, acceleration, or direction of the movement of an object around the touch-sensitive area, the design of the user interface (e.g., the size of a text box or the position of a check box), user input type (e.g., slow drawing, handwritten text, or signature), the history of the movements of the object, pressure information provided by pressure sensor, random prediction, and so on. This disclosure contemplates any applicable metric.

In particular embodiments, when scanning the nodes (e.g., either the nodes in the entire touch-sensitive area or only the nodes within a selected region), the direction of the scan may depend on in which direction the object moves. In some implementations, if the object is relatively stationary, the scan may be performed from top to bottom and left to right. If the object is moving toward a specific direction, the scan may be performed in the opposition direction from where the object is moving. For example, in FIG. 7, from location 701 to location 702, it may be determined that the object is moving toward bottom-right direction 731. Thus, when scanning the nodes to determine the current location of the object, the scan may be performed in the opposite direction 732, starting from the bottom-right corner of touch-sensitive area 700 or window 712 and proceeding toward the top-left corner of touch-sensitive area 700 or window 712. In this case, the direction of the scan 732 is opposite of the direction of the object's moving 731, and this may ensure that the scan meets up with the object and does not miss the object.

In some implementations, the scan may begin at a random location on the touch-sensitive area. This may help enable more robustness to systematic noise. In some implementations, a quadrant of the touch-sensitive area may be selected based on the location of the object or the direction in which the object is moving. Then, the scan may begin at a random location within the selected quadrant. For example, in FIG. 7, location 701 is in the top-left quadrant of touch-sensitive area 700. Thus, for the next scan, the top-left quadrant of touch-sensitive area 700 may be selected. The scan may begin at a random location in the selected top-left quadrant of touch-sensitive area 700. Alternatively, the scan may begin at the bottom-right corner of the top-left quadrant of touch-sensitive area 700 and proceed in direction 732, because the object is moving in direction 731 toward the bottom-right.

As described above in connection with STEP 610 and STEPS 620 and 630 of FIG. 6, in particular embodiments, when scanning a touch-sensitive area of a touch sensor to, for example, determine the location of a touch, there are two possible approaches. First, the entire touch-sensitive area may be scanned (e.g., either scanning all or some of the nodes in the entire touch-sensitive area). In some cases, this may provide an approximate location of the touch. In some embodiments, a neighboring region of the approximate location of the touch may be scanned again to determine a more precise location of the touch. Second, a region within the touch-sensitive area may be selected. For example, this region may be a neighboring region of a previously determined location of a touch. This selected region may be scanned (e.g., again, either scanning all or some of the nodes within the selected region) to, for example, determine the current location of the touch.

In particular embodiments, these two approaches may be combined in various permutations. In some implementations, as an object (e.g., a stylus or a user's finger) moves around a touch-sensitive area, its current location may be repeatedly determined in successive iterations. During each iteration, either one of the two approaches for scanning the touch-sensitive area may be employed. As an example, the iterations may alternate between the two approaches, first scanning the entire touch-sensitive area, then scanning a selected region within the touch-sensitive area, then scanning the entire touch-sensitive area, and so on. As another example, the entire touch-sensitive area may be scanned less often than the selected regions (e.g., scanning the entire touch-sensitive area every fifth iteration only and scanning the selected regions during the other iterations). As a third example, the entire touch-sensitive area is scanned only when needed (e.g., scanning the selected regions during most of the iterations, and scanning the entire touch-sensitive area when one of the conditions described above in connection with STEP 640 of FIG. 6 occurs). This disclosure contemplates any applicable permutation for combining the two approaches.

Selectively scanning specific regions within a touch-sensitive area, instead of scanning the entire touch-sensitive area, has many advantages. For example, the process of scanning electrodes consumes power. The larger area being scanned, the more power being consumed. Thus, scanning the entire touch-sensitive area consumes more power than scanning only specific regions within the touch-sensitive area. Consequently, selectively scanning specific regions within a touch-sensitive area reduces power consumption.

Particular embodiments may repeat the steps of the method of FIG. 6, where appropriate. Moreover, although this disclosure describes and illustrates particular steps of the method of FIG. 6 as occurring in a particular order, this disclosure contemplates any suitable steps of the method of FIG. 6 occurring in any suitable order. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Herein, reference to a computer-readable non-transitory storage medium may include a semiconductor-based or other integrated circuit (IC) (such as, for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, another suitable computer-readable non-transitory storage medium, or a suitable combination of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. An apparatus comprising:
a touch sensor comprising a touch-sensitive area; and
a touch-sensor controller coupled to the touch sensor and operable to:
select a first region around a previously determined first location associated with a stylus within the touch-sensitive area; and
scan two or more electrodes within the first region to determine a second location associated with the stylus within the touch-sensitive area, wherein a starting position of the scan and a direction of the scan are determined based on one or more first metrics, wherein the direction of the scan is opposite of a direction toward which the stylus is moving around the touch-sensitive area.

2. The apparatus of claim 1, wherein the touch-sensor controller is further operable to:
select a second region around the second location associated with the stylus within the touch-sensitive area; and
scan the two or more electrodes within the second region to determine a third location associated with the stylus within the touch-sensitive area.

3. The apparatus of claim 1, wherein a size and a position of the first region are determined based on one or more second metrics, comprising one or more of:
a speed of the stylus moving around the touch-sensitive area;
an acceleration of the stylus moving around the touch-sensitive area;
a direction toward which the stylus moves around the touch-sensitive area;
a movement history of the stylus; or
a user interface of the touch sensor.

4. The apparatus of claim 3, wherein:
the faster the stylus moves, the larger the first region and the slower the stylus moves, the smaller the first region; and
the first region is positioned around the first location such that there is more space inside the first region in the direction toward which the stylus moves.

5. The apparatus of claim 1, wherein the touch-sensor controller is further operable to:
determine whether to scan a specific region within the touch-sensitive area or the entire touch-sensitive area to determine a third location associated with the stylus within the touch-sensitive area;
when any one of one or more conditions is satisfied, then scan two or more electrodes within the touch-sensitive area to determine the third location associated with the stylus within the touch-sensitive area; and
when none of the one or more conditions is satisfied, then:
select a second region around the second location associated with the stylus; and
scan two or more electrodes within the second region to determine the third location associated with the stylus within the touch-sensitive area.

6. The apparatus of claim 5, wherein the one or more conditions comprise one or more of:
a predetermined time interval has passed since all the electrodes of the touch-sensitive area have been scanned previously;
a contextual change has occurred;
an interface change has occurred;
the touch-sensor apparatus has fallen out of calibration;
the stylus has moved outside of the first region; or
the stylus has moved outside of the touch-sensitive area.

7. The apparatus of claim 1, wherein the touch-sensor controller is further operable to determine the first location associated with the stylus within the touch-sensitive area.

8. The apparatus of claim 7, wherein determining the first location associated with the stylus within the touch-sensitive area comprises scanning two or more electrodes within the touch-sensitive area to determine the first location associated with the stylus within the touch-sensitive area.

9. The apparatus of claim 8, wherein when scanning the two or more electrodes within the touch-sensitive area to determine the first location associated with the stylus within the touch-sensitive area, a starting position of the scan of the two or more electrodes within the touch-sensitive area to determine the first location and a direction of the scan of the two or more electrodes within the touch-sensitive area to determine the first location are determined based on one or more second metrics.

10. A method comprising: by a touch-sensor controller,
selecting a first region around a previously determined first location associated with a stylus within a touch-sensitive area of a touch sensor coupled to the touch-sensor controller; and
scanning two or more electrodes within the first region to determine a second location associated with the stylus within the touch-sensitive area, wherein a starting position of the scan and a direction of the scan are determined based on one or more first metrics, wherein the direction of the scan is opposite of a direction toward which the stylus is moving around the touch-sensitive area.

11. The method of claim 10, further comprising:
selecting a second region around the second location associated with the stylus within the touch-sensitive area; and
scanning the two or more electrodes within the second region to determine a third location associated with the stylus within the touch-sensitive area.

12. The method of claim 10, wherein a size and a position of the first region are determined based on one or more second metrics, comprising one or more of:
a speed of the stylus moving around the touch-sensitive area;
an acceleration of the stylus moving around the touch-sensitive area;
a direction toward which the stylus moves around the touch-sensitive area;
a movement history of the stylus; or
a user interface of the touch sensor.

13. The method of claim 10, further comprising:
determining whether to scan a specific region within the touch-sensitive area or the entire touch-sensitive area to determine a third location associated with the stylus within the touch-sensitive area;
when any one of one or more conditions is satisfied, then scanning two or more electrodes within the touch-sensitive area to determine the third location associated with the stylus within the touch-sensitive area; and
when none of the one or more conditions is satisfied, then:
selecting a second region around the second location associated with the stylus; and
scanning two or more electrodes within the second region to determine the third location associated with the stylus within the touch-sensitive area.

14. The method of claim 13, wherein the one or more conditions comprise one or more of:
- a predetermined time interval has passed since all the electrodes of the touch-sensitive area have been scanned previously;
- a contextual change has occurred;
- an interface change has occurred;
- the touch-sensor apparatus has fallen out of calibration;
- the stylus has moved outside of the first region; or
- the stylus has moved outside of the touch-sensitive area.

15. One or more computer-readable non-transitory storage media embodying logic that is operable when executed to:
- select a first region around a previously determined first location associated with a stylus within the touch-sensitive area; and
- scan two or more electrodes within the first region to determine a second location associated with the stylus within the touch-sensitive area, wherein a starting position of the scan and a direction of the scan are determined based on one or more first metrics, wherein the direction of the scan is opposite of a direction toward which the stylus is moving around the touch-sensitive area.

16. The media of claim 15, wherein the media is further operable to:
- select a second region around the second location associated with the stylus within the touch-sensitive area; and
- scan the two or more electrodes within the second region to determine a third location associated with the stylus within the touch-sensitive area.

* * * * *